United States Patent [19]
Hardy

[11] Patent Number: 5,437,116
[45] Date of Patent: Aug. 1, 1995

[54] MODULAR SIGN SYSTEM

[75] Inventor: Stephen N. Hardy, Copley, Ohio

[73] Assignee: RTC Industries, Inc., Chicago, Ill.

[21] Appl. No.: 71,442

[22] Filed: Jun. 3, 1993

[51] Int. Cl.6 .............................................. G09F 7/00
[52] U.S. Cl. ...................................... 40/605; 211/189
[58] Field of Search ................ 40/605, 606, 124, 642, 40/649; 211/189, 193, 195

[56] References Cited

U.S. PATENT DOCUMENTS

| | | | |
|---|---|---|---|
| 4,762,235 | 8/1988 | Howard et al. | 211/193 |
| 4,798,013 | 1/1989 | Sainato | 40/124 |
| 5,014,862 | 5/1991 | Bustos | 211/189 |
| 5,272,991 | 12/1993 | Carrigan, Jr. | 211/193 |

Primary Examiner—James R. Britain
Assistant Examiner—Cassandra Davis
Attorney, Agent, or Firm—Dressler, Goldsmith, Shore & Milnamow, Ltd.

[57] ABSTRACT

A sign display assembly for a gondola-type shelving arrangement. The display system includes a bracket and a support arm assembly to which a sign support is connected. The support arm assembly includes telescoping support arms and a support clip. The support clip includes projections for securing the support clip to the support arms and flanges that are placed in a track found on the back of the sign supports to interengage the sign with the support assembly.

26 Claims, 9 Drawing Sheets

MODULAR SIGN SYSTEM

BACKGROUND OF THE INVENTION

This invention relates to display systems, and particularly to display assemblies that can be mounted above a gondola system. Such systems are designed to provide for the insertion of various types of advertising and descriptive materials, such as, product illustrations, endorsements, pricing schedules, and other types of information that will be helpful in promoting the sale of the products located on the shelving system disposed adjacent thereto.

While the utilization of product display systems is well known in the point-of-purchase display industry, there has not been the ready availability of systems that are relatively low in cost, flexible in design and can be readily assembled and disassembled relative to the shelving to which it is to be connected in an expeditious and efficient manner. Heretofore, it has not been possible to readily vary the orientation of the signage, which may have a significant impact with respect to the products being disposed for sale therebelow.

Specifically, it has long been desirable to provide for signage that can be readily located in a vertical or angled position, which positioning can be adjusted to maximize the effectiveness of the display. Such systems that have heretofore been utilized have not been particularly attractive and do not lend themselves readily for location on more than one side of the shelving system with which it is to be employed. There has been a long-felt need in the point-of-purchase display industry to provide a system that can be readily connected to conventional gondola-type shelving that can be positioned relative to such shelving in a vertical or angled position.

The system for carrying various types of point-of-purchase display devices should be quickly and easily adaptable to conventional gondola-type standards. The system should be sufficiently versatile to support the display area throughout the length of the gondola and to accomplish this, it is necessary that the display system be supported at various points along the transverse location of the display by very simple mechanisms which can be readily interchanged, depending on the orientation of the display system that is desired.

SUMMARY OF THE INVENTION

In accordance with the present invention, there is provided a system that can be mounted directly to a standard or spaced therefrom by one or a pair of telescoping support arms that are connected at one end through a bracket to a standard of a gondola system and its other end to a support clip to which the sign support can be readily mounted and onto which the advertising or point-of-purchase display literature can be readily placed. The support assemblies are constructed so that they can support the signage at its ends as well as in the middle, and also can be readily adjusted to locate the sign in a vertical direction or an angled position.

The support clip is designed so that it can be positioned to angle the sign support back toward the standard or away from the standard, depending on its orientation. This is in addition to providing a vertical surface that locates the sign support normal to the support arms to which the support clips are connected. The support clips are provided with flexibly mounted projections that fit into the support arms to secure the support clips relative to the support arms. The telescoped support arms are adjustable to any desired position and are retained in place by a clip assemblage that positions the support arms relative to each other once they are properly located. The telescoping arms are designed to smoothly move relative to each other. At the inner end of the support arms adjacent the gondola standard, a bracket is located which is secured to the support arms through the engagement of a twisted tongue formed in the bracket, which tongue fits into an opening in the support arm. The other end of the bracket is provided with hooks that extend into suitable openings provided in the standard forming part of the gondola system.

Once the support clips are located in position relative to the gondola standards, the sign supports which are provided with suitable tracks can be located on the support clips to affix the sign supports in the desired position. In order to provide for accurate location of signs placed next to each other an alignment clip is used to extend through suitable openings in adjacent sign supports. Also, if the sign supports are of a size that may require intermediate reinforcing, a transversely extending stiffener strip is located intermediate the top and bottom of the sign support.

To provide for the desired orientation of the sign support relative to the support clips, there are provided spaced pairs of tracks into which the support clips fit. If the sign support is to be located in a vertical orientation, the vertically disposed flanges on the vertical face of the support clip fit into the track to retain the sign support in a vertical position. If the sign support is to extend at an angle relative to the standard, the support clip is turned around to expose the angled face of the clip. The angled face of the clip can be located to direct the upper part of the sign support toward or away from the standard of the gondola system.

A relatively simple arrangement is provided to affix the support slip relative to the support arms. This consists of a flexible T-shaped member having a projection that is designed to fit into a similarly shaped opening in the support arm that extends through a slot in the support clip. Thus, when the support clip is intended to be connected to the arm, the T-shaped member is cammed out of the way through the engagement of the support arm with the projection portion of the T-shaped member to permit the support arm to be inserted and to have the opening in the support arm come into alignment with the projection formed on the T-shaped member. When alignment occurs, the projection fits into the support arm opening and thus is fixed to the support arm which completes the construction of the support assembly by which the support clip is fixed to the support arm and through the support arm to the gondola standard.

Also as part of the novel sign system, there is provided a horizontally mounted bottom panel. The bottom panel can be translucent if desired to pass light therethrough. This would close off the area within which the support clips and adjusting arms are located to make for an enclosed attractive display. The bottom panel is supported relative to the support arms by a retaining member that extends over the support arms and provides at its lower end a horizontally extending flange portion on which the bottom panel rests.

Where the bottom panel is of an extended width, a second member may be used to prevent the panel from sagging.

Another feature of the unique shelving system disclosed herein is the utilization of end covers in order to make for a smooth transition from the front to the sides of the display system if the signage is to cover more than one side of the gondola system. This dramatically improves the appearance of the display system, thus enhancing the attractiveness of what would otherwise be a conventional shelving rack. If the display system is disposed in a vertical direction, a relatively simple vertically disposed cover cap is employed. If the sign support is located on an angle, then, of course, a generally triangularly shaped end support cap is used in order to make the transition from the front to the side of the signage. Employing these relatively simple but attractive corner caps allows the sign display to extend partly or the entire 360 degrees around the gondola system. Also, of course, simple vertical panels can be used if it is not desired to make a smooth curved transition around the upper portion of the gondola system.

A further feature of this invention is to be able to provide for various types, sizes and shapes of signs to be mounted on the gondola system. The novel support clip enables such sign supports to be connected to the gondola system. In the case of an irregular shape or other types of sign supports to be connected to a gondola system, a sign support is connected to the support clip. To complete the system, there is secured to the sign support a clip assemblage that fits through the sign support to be mounted relative thereto. This provides for a very simple and effective way of mounting an irregular type sign onto the support clip by the utilization of an intermediate sign support mechanism.

The various mechanisms can be made of a suitable plastic material, or if desired stronger materials, such as extruded aluminum for the support arms, or cold weld steel for the brackets to which the support arms are connected, which brackets extend into the standards of the gondola system.

BRIEF DESCRIPTION OF THE DRAWINGS

The following is a description of the accompanying drawings forming part of the specification in which like numerals are employed to designate like parts throughout.

DETAILED DESCRIPTION OF THE INVENTION

Figure 1:
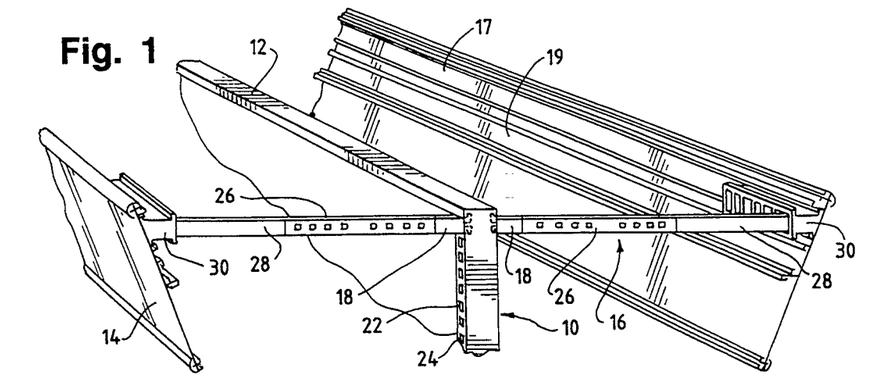
FIG. 1 is a partial perspective view illustrating signs located and secured to opposite sides of a gondola counter top, with the sign supports being directed in a downward direction toward the gondola and having its upper end coextensive with the gondola top.

Referring with greater particularity to the drawings, we refer first to FIG. 1, where there is illustrated the upper end of a gondola system 10, which, as is well known to those in the industry, comprises a commercial shelving system including a base, upright, and shelves secured thereto. (See FIG. 29 for a perspective view of a complete system.) The gondola 10 is shown in the upright position, with gondola top 12 forming the upper surface of the system to which the shelves are attached. As can be seen by referring to FIG. 39, the upper portion of the gondola system 10 is but a part of the overall system which consists of shelves 11 supported by brackets 13 hooked into standards 24, which brackets 13 form part of the shelf assemblies.

Connected to the upper portion of the gondola is the display system to which the instant invention is directed. Specifically, the display system enables the store owner to provide suitable advertising media or other materials relating to the type of product, product pricing, etc., found on the shelves below the display system.

Figure 2:
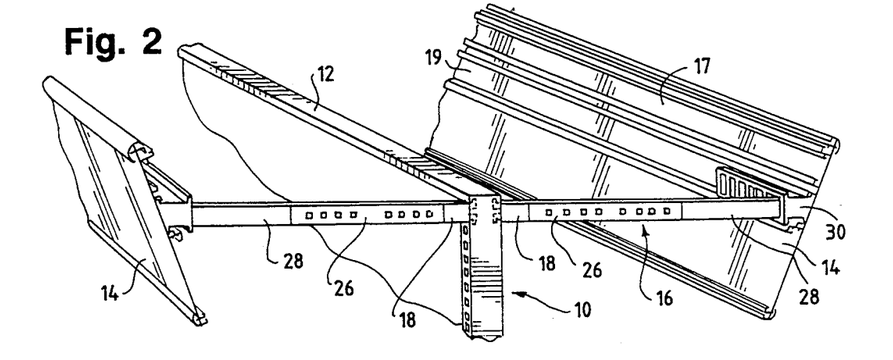
FIG. 2 is an illustration similar to FIG. 1, in which three quarters of the sign support is disposed below the gondola top.
Figure 3:
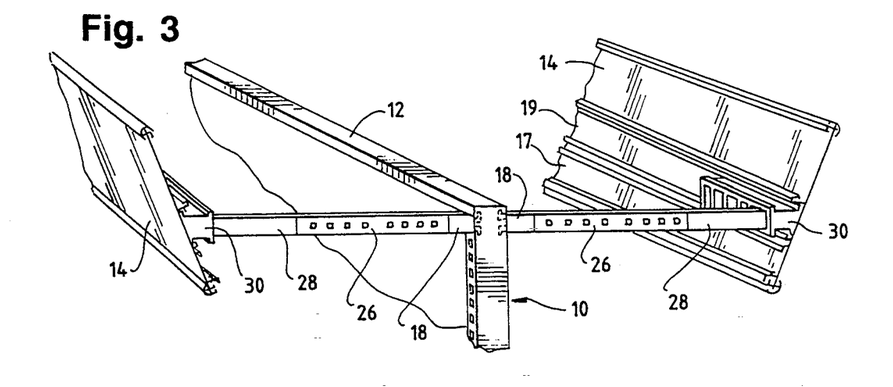
FIG. 3 illustrates a system in which three quarters of the signs support is disposed above the gondola top.
Figure 4:
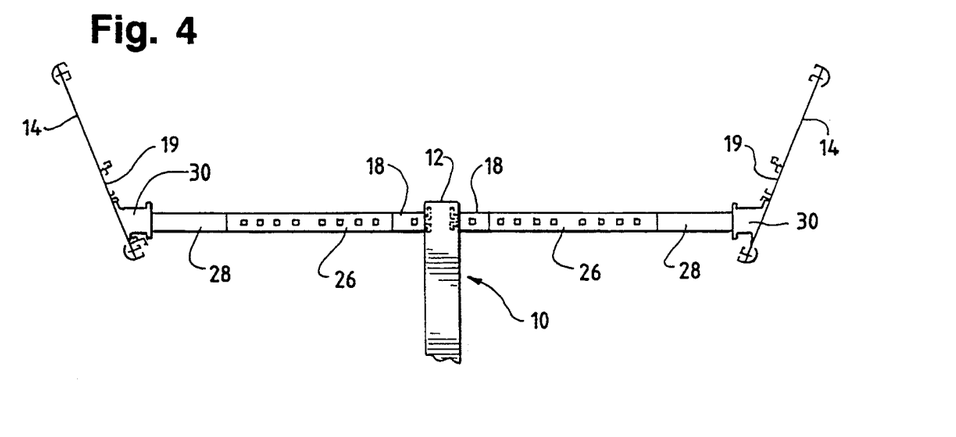
FIG. 4 is a view showing the sign supports being disposed above the gondola top and extending outwardly away from the gondola top.
Figure 5:
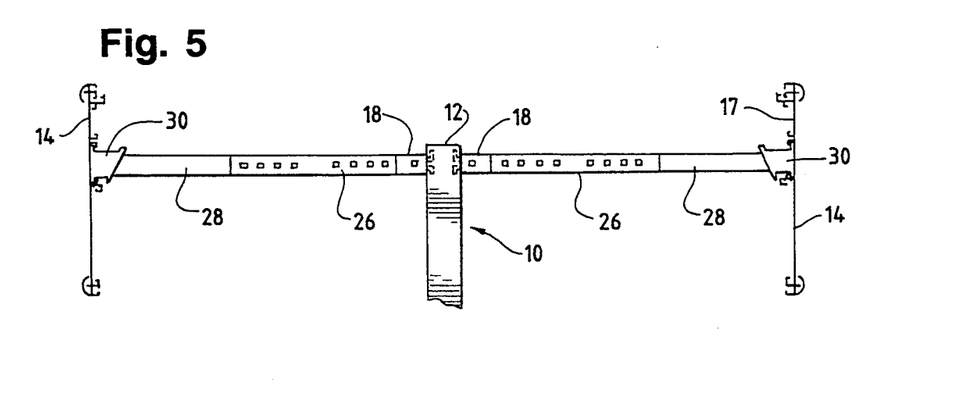
FIG. 5 is a view in which the sign supports are disposed in a vertical orientation relative to the gondola.
Figure 6:
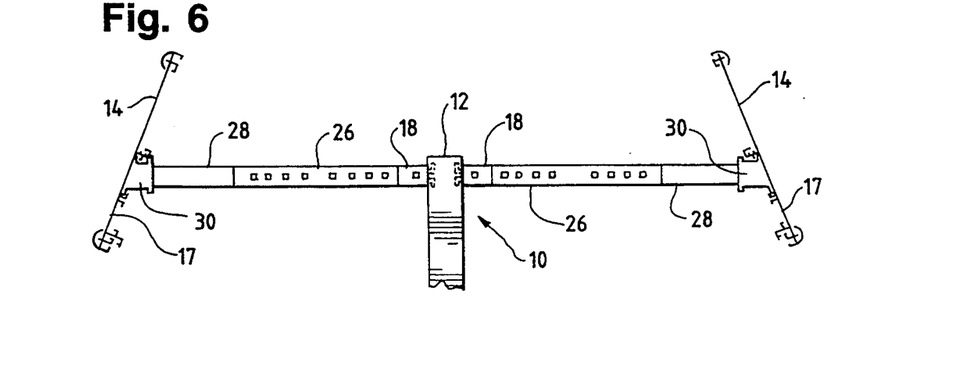
FIG. 6 is a view in which the sign supports are disposed in an upward direction, with three quarters of the sign support being disposed above and toward the gondola top.

In FIG. 1, there is illustrated a display system wherein the sign support 14 is connected by a support assembly 16 to be described in detail hereinafter to the upper part of the gondola, with the sign support 14 essentially located below the gondola top. The sign support 14 includes a plurality of tracks 17,19 formed on its rear surface that permits the sign support assembly 16 and associated sign support 14 to be positioned so that three quarters of the sign support is located below the top of the gondola as shown in FIG. 2, or three quarters of the sign support 14 is located above the top of the gondola as shown in FIG. 3. FIGS. 4, 5, and 6 show different positions of the sign support 14 mounted relative to the gondola top 12.

In FIG. 4, the sign support is angled outwardly away from the gondola top and is essentially located above the gondola top. In FIG. 5, the sign support 14 is disposed in a vertical direction, with the major portion of the sign support located below the gondola top, and FIG. 6 shows the sign support slanted upwardly and inwardly toward the gondola top, with the major portion of the sign support being located above the gondola top.

Returning again to FIG. 1, the sign support 14 is located essentially below the gondola top by having the sign support assembly 16 secured to the guide track portion 17 of the sign support 14.

Schematically illustrated in FIGS. 1-6 is the support assembly 16 that interconnects the sign support 14 to the gondola 10. Specifically, the support assembly consists of a bracket 18 that has hook portions 20 (see FIG. 7) that fit into slots 22 in the standard 24. Suitably connected to the bracket 18 by a mechanism discussed in detail hereinafter are a pair of telescoping arms 26,28 (see FIG. 7) which allow the distance between the standard 22 and sign support 14 to be adjusted to various lengths as desired. The end of the telescoping arm 28 is suitably connected to a support clip 30 which is disposed in the track 17 formed as part of the sign support 14. As previously mentioned, there are two guide channels 17,19 provided which enable the sign supports to be supported in the various positions shown in FIGS. 1-6. Specifically, in FIG. 1, the upper guide track 17 is used, which results in the sign support being positioned to extend below the top 12 of the gondola, whereas, in FIG. 2, the support clip is disposed in the lower of the two guide channels 19 to locate the sign support 14 in a different position relative to the gondola top.

In FIGS. 3-6, there are shown various other relationships between the support clip 30 and the various guide channels 17,19 of the sign supports, enabling the sign supports to be positioned as shown in each of those figures.

Figures 7, 8, 9, 10:
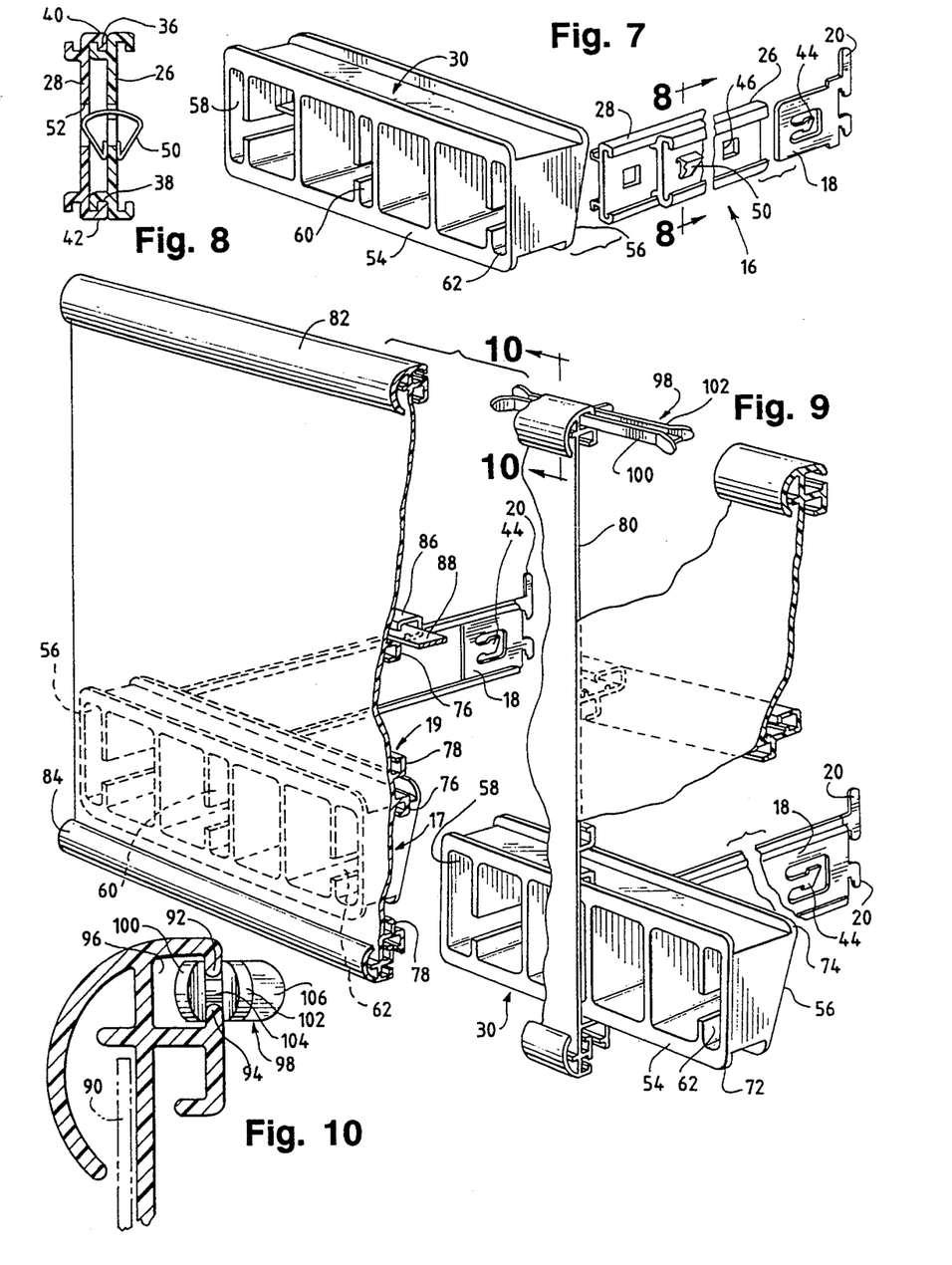
FIG. 7 is an exploded view which shows the support clip in perspective and the support arms in a telescoping interconnected relationship along with the bracket for supporting the arms relative to the gondola standard.
FIG. 8 is a cross-sectional view taken along line 8—8 of FIG. 7 showing the support arms in telescoping relationship and being retained in position relative to each other by an adjustment clip.
FIG. 9 is a partially broken away exploded elevational view showing the support clips affixed to the support arms and the sign supports being positioned with respect thereto, as well as the mechanism for aligning adjacent sign supports.
FIG. 10 is a partial cross-sectional view taken along line 10—10 of FIG. 9 showing an alignment clip located in position relative to one of the sign supports.
Figure 11:
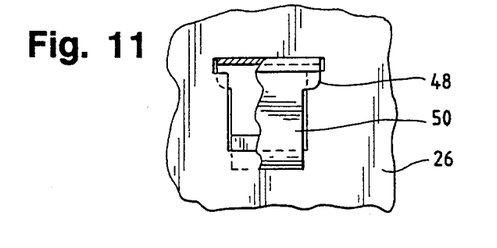
FIG. 11 is a partial view showing the location of an adjustment clip located in a clip containment hole in a support arm.

Referring now to FIG. 7, there is shown an exploded perspective view of the connection between the standard (not shown) to which the bracket 18 is hooked into, and the support clip 30 to which the sign support 14 is connected, as shown in FIGS. 1-6.

As aforementioned, the bracket 18 consists of hooks 20 that fit into slots 22 in a gondola standard. Depending on the distance the sign support is to be spaced from the standard, the support clip can be directly connected to the bracket in a manner described hereinafter or the support arm 26 can be directly connected to the support clip 30. In addition, as illustrated in the drawings, when the distance between the standard and sign support is somewhat longer than a single support arm could effectively function, a second telescoping member 28 is employed for spacing the sign support at a variable distance relative to the gondola by moving the telescoping members 26,28 relative to each other.

Referring to FIG. 8, there is shown the telescoping relationship between the support arms 26 and 28, and it can be seen from this view that the support arm 26 defines an upwardly extending groove 36 and a downwardly extending groove 38 into which downwardly extending flange 40 of support member 28 fits and upwardly extending flange of 42 of support member 28 fits into grooves 36,38, respectively. The fit between the two supporting members 26,28 is such as to permit a smooth sliding movement relative thereto to facilitate the adjustment of the distance that the sign support 14 is to be located relative to the gondola 10.

In order to affix the slidable, telescoping support members 26,28 in position, once they are properly located, there is provided a generally triangular shaped spring clip 50. The clip 50 is located in clip containment hole 48 of support member 26 and ultimately will fit into a clip engagement hole 52 of support arm 28 to retain the supporting members 26,28 relative to each other after the requisite length is obtained.

It can be appreciated that one can merely grip the clip 50 and move it to the right as shown in FIG. 8 and slide the support member 28 the requisite distance to where an opening 52 is aligned with the clip 50 and then clip 50 can be released to allow it to extend into the hole 51 to prevent further relative movement between telescoping members.

The securing of the bracket 18 relative to the telescoping member 26 is provided by means of the interengagement between a twisted tongue portion 44 formed in the bracket 18 and a tongue engagement hole 46 located in the end portion of the supporting member 26.

Figure 13:
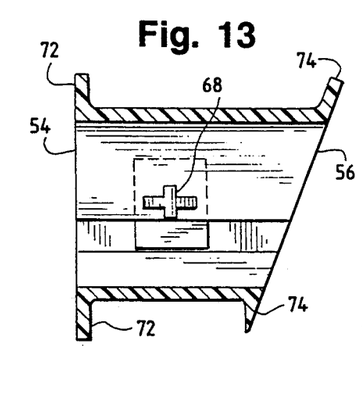
FIG. 13 is a cross-sectional view of the support clip illustrating the + shaped head of the T-shaped locking mechanism.
Figure 14:
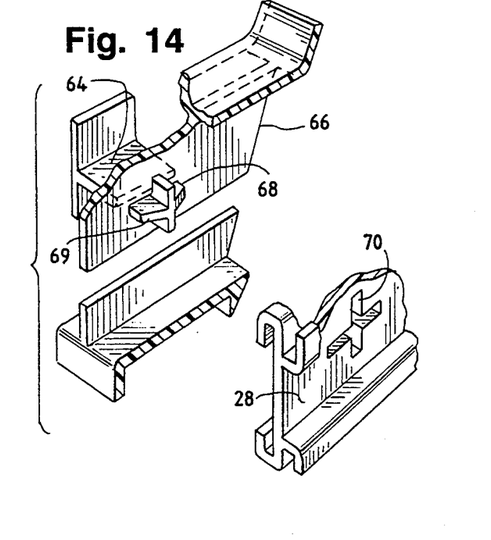
FIG. 14 is an exploded perspective view showing the cooperating portions of the T-shaped locking head and support arm.

The support clip 30 is connected to the end of the support arm 28 in the following manner. The support clip 30 has a generally trapezoidal cross section consisting of a generally vertical face 54 and an angled face 56. The clip 30 includes three slot portions 58,60 and 62 extending therethrough. Located adjacent each of the slot portions is a T-shaped member 64 (see FIGS. 12-14) which is connected to a flange 66 depending from an adjacent wall of the support clip 30. The end of the T-shaped member 64 includes a + shaped head 68 that is designed to extend into a + shaped opening 70 formed in the end of the support arm 28 to retain the support clip 30 in position relative to the support arm 28. The three slots that are provided in the support clip 30 consisting of one at each end and one in the middle permits the support clip to be held in position at various locations relative to the sign support 14. Thus, if the sign support was to be supported at two ends, the opposite end slots 58,62 of the support clip would be the ones that would be used to retain the support clip relative to the support arms. If it was desired the sign support be also supported in the middle or at a juncture between two adjacent sign supports, then the intermediate slot 60 would be used. It is further to be noted that if the sign support is to be vertically oriented, the vertical face 54 would abut the sign support, or if it was to be angled either toward or away from the gondola top, then the angled surface 56 would abut the sign support.

As will be seen in FIG. 7, the components are shown wherein the slot 62 is to receive the end of the support arm 28. In FIG. 9, there is shown an arrangement whereby on the left hand section of the support arm 28 is located in the slot 58 of support clip 30, whereas, in the right-hand section, the support arm 28 is located in the slot 60.

Figure 12:
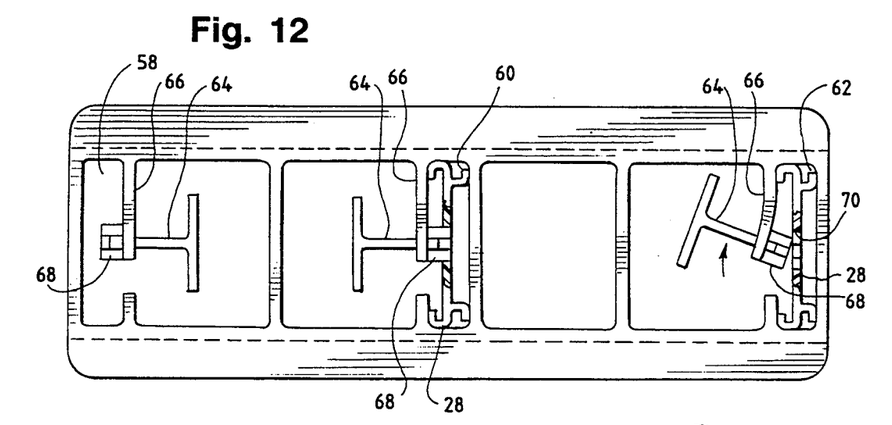
FIG. 12 is a front view, partially broken away, showing support arms located in position within the slots of the support clip, both before and after they are interlocked relative to the support clip.

Attention is now directed to the right-hand section of FIG. 12, wherein there is shown the position of the T-shaped member 64 prior to its insertion into opening 70 in the support arm 28, but showing the support arm 28 located within the slot 62. The support arm 28 when moved into slot 62 acts against the sloped surface 69 of projection 68 to move the T-shaped member to the position shown in FIG. 12. When the support arm is moved in slot 62 to where the projection 68 is in line with slot 70 of the support member 28, as shown in the slot 60, the projection 68 moves into opening 70 to lock the support clip 30 in position relative to the support arm 28. The particular configuration of the T-shaped member and support arm 28 is shown most graphically in FIG. 14 in an exploded perspective view.

It is to be noted that if the support clip is to be mounted immediately adjacent the standard to bracket 18 is provided with a + shaped opening instead of the tongue 44, which opening will receive the head 68 of the T-shaped member 64 when the bracket is inserted into one of the support clip openings 58,60 or 62.

Returning again to FIG. 7 and FIG. 13, it is to be noted that the support clip 30 includes vertically disposed flanges 72 at the vertically disposed end 54 and angularly disposed flanges 74 on the angled side 56. During the location of the sign support 14 relative to the support clip 30, the tracks 17,19 for receiving the flanges 72 or 74 consist of flange guides 76 and 78 into which the flanges 72 or 74 slide to locate the sign support 14 relative to the support clip. As previously mentioned, depending on the sign support position relative to the support clip that is desired would depend which of the channels 17,19 are used.

In FIG. 9, there is illustrated a vertical orientation of the sign support 14, which results in the flat sign support wall 80 abutting the front vertical face 54 of the support clip 30. The sign support 14 also includes curved flanges 82,84 that along with the flat wall 80 of the sign support serve as the support for the advertising media or other displays that are to be supported by the sign support. The upper downwardly curved flange 82 in conjunction with flat wall 80 serves to retain the upper portion of the advertising material in place, and the lower upwardly curved flange 84 serves to retain the bottom of the advertising material in place relative to the sign support wall 80.

In the event a relatively long sign support is used, provision is made for a stiffener 88 that fits into a retainer section 86 formed as part of the sign support and located intermediate its upper and lower portions.

With the sign support located in the desired position relative to the support clips 30, advertising material 90 (see FIG. 10) can be inserted between the curved flanges 82 and 84 against the sign support wall 80 to inform prospective customers.

The upper and lower transversely extending portions of the sign are constructed generally as shown in FIG. 10. When two sign supports are located next to each other in abutting relationship to insure their alignment, an alignment clip 98 is used which is generally H-shaped. The vertical wall 100 is disposed in adjacent openings 96 in the upper portion of the sign, which wall is retained therein by flanges 92,94. The two vertically disposed walls 100,102 of the adjustment clip are separated but interconnected by an intermediate connecting wall 104. The alignment clip 98 also includes a gripping handle 106. Thus, it can be seen that when adjacent sign supports are to be aligned, the clip 98 is introduced into adjacent openings 96 of the abutting sign supports and acts to retain them in alignment such as generally indicated in the upper part of FIG. 9.

Figures 15, 16:
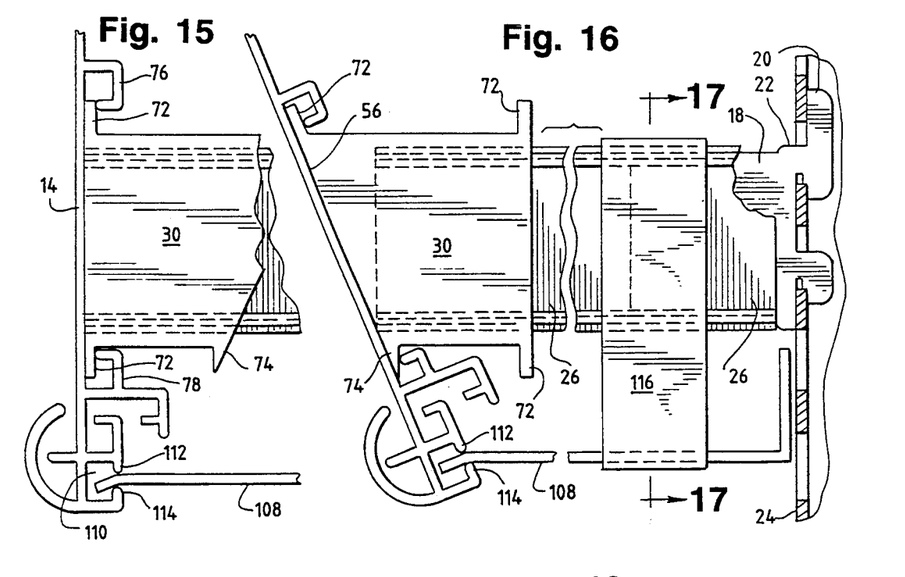
FIG. 15 is a view showing the support clip and bottom panel located in place relative to a sign support panel disposed in a vertical position.
FIG. 16 is a partial elevation view showing the sign support disposed in an angled position relative to the support clip and the mechanism for supporting a bottom panel relative to the support arms.

Referring now to FIG. 15, there is illustrated a sign support 14 located in the vertical position with the flanges 72 of the support clip 30 located within the track defined by the flange guide channels 76,78. At the lower part of the sign support 14, there is located a bottom panel 108 that is retained in position relative to the sign support 14. The bottom panel 108 is an optional addition and is horizontally mounted and may be translucent to pass light therethrough. The front end of the panel 108 is located between converging flanges 112,114 of the sign support 14 and extends into a transversely extending recess 110.

FIG. 16 illustrates a support clip reversed from that shown in FIG. 15 to dispose the angular surface 56 to the sign support 14. It is noted that the flange guide channels 76,78 still function to retain the sign support 14 relative to the support clip 30 and the panel 108 remains located in the recess 110 positioned between the flanges 112,114. In addition, FIG. 16 shows the connection between the bracket 18 and the standard 24 in which the hooks 20 are located within the slots 22 to retain the bracket 18 and associated support arms 26,28 and clip assembly 30 relative to the standard 24.

Figures 17, 18, 19:
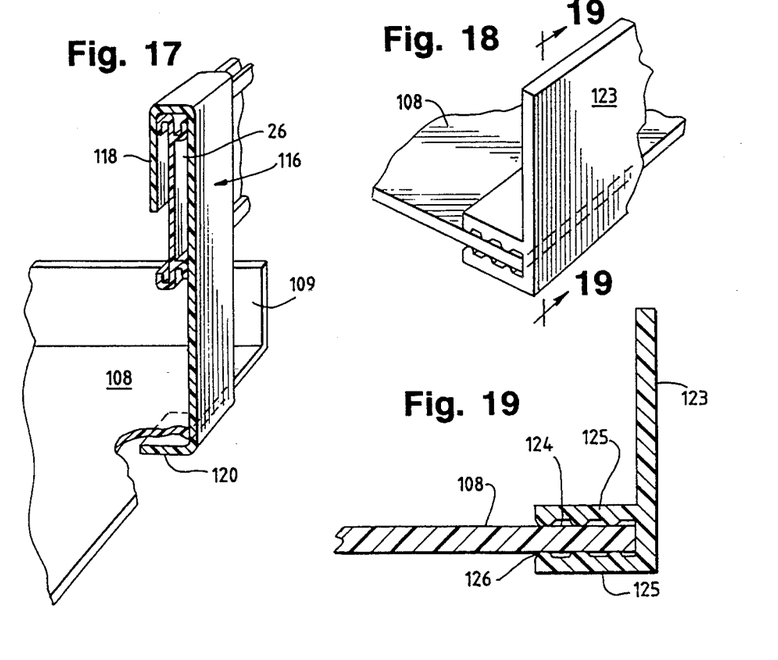
FIG. 17 is a view taken along line 17—17 of FIG. 16 showing, in perspective, a cross-sectional view of the support clip for the bottom panel.
FIG. 18 is a partial perspective view showing an L-shaped member installed for preventing the bottom panel from sagging.
FIG. 19 is a cross-sectional view taken along line 19—19 of FIG. 18 illustrating the holding member in place for supporting the bottom panel.

In order to retain the bottom panel in position relative to the sign support 14, there is provided a supporting member 116 as shown in FIG. 17. Support member 116 has a downwardly extending flange 118 that extends over the support arm 26 to locate the bottom panel relative thereto. At the lower end of the support member 116, there is provided a horizontally disposed arm 120 that extends under the panel 108. In the embodiment shown in FIG. 17, the bottom panel 108 has a vertically extending back wall 109 to provide rigidity thereto. In FIG. 19, the bottom panel 108 has no back wall and an L-shaped support 123 extending substantially the full width of the panel 108 is used to prevent the bottom panel from sagging. This L-shaped support 123 includes a recessed opening 124 extending between two spaced flanges 125 on which beads 126 are formed that act to grip the bottom panel 108, as shown in cross section in FIG. 19.

Heretofore, the construction of the sign support and the support assembly therefor has been described in detail.

Figure 20:
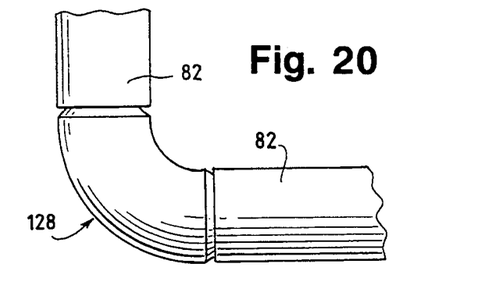
FIG. 20 is a plan view showing the connection between the front and side sign supports of a vertically disposed sign support assembly.
Figure 21:
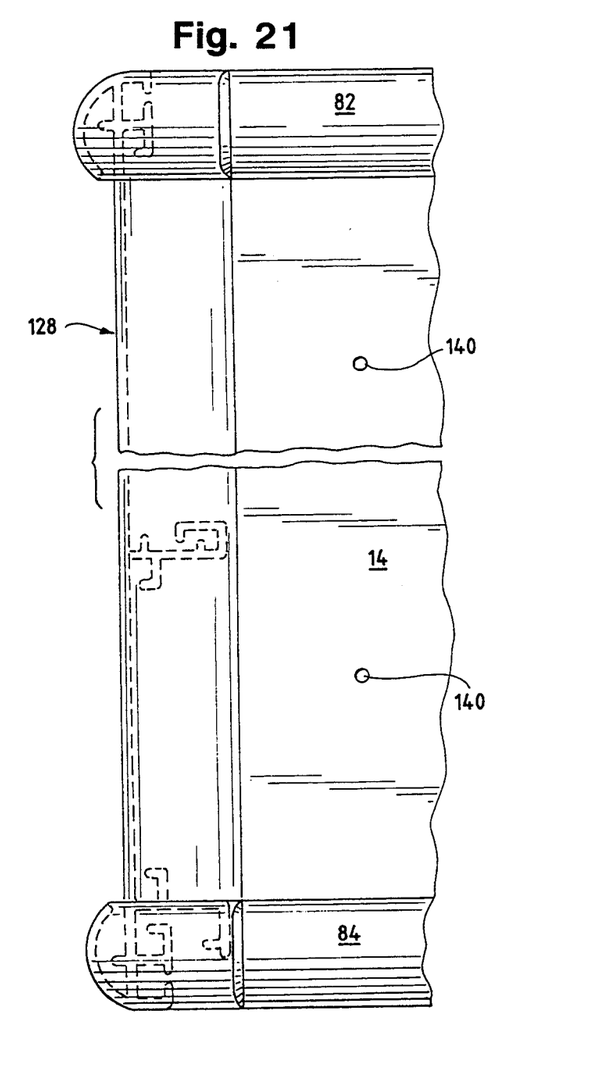
FIG. 21 is an elevational view showing the connection between the corner connector and the front sign support.
Figure 22:
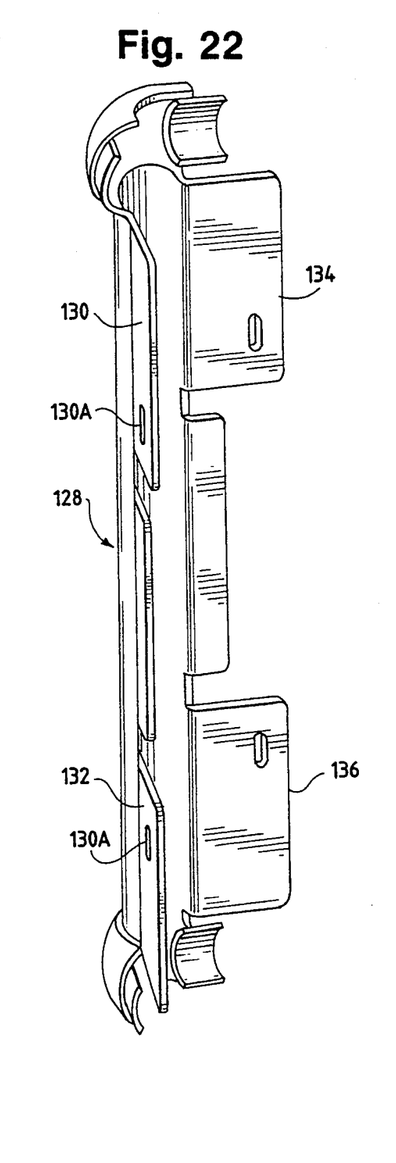
FIG 22 is a perspective view of the corner connector.

When it is desired to have sign supports, located on three sides of a gondola, extend around only one corner or extend completely around the top of a gondola, provisions are made to provide corner caps to make for a smooth transition of sign supports that are disposed at a 90° angle relative to each other. In FIGS. 20, 21, and 22, there are shown in various views a corner cap and assembly for making a transition between sign supports that are vertically disposed and located normal to each other. Referring specifically to FIG. 22, there is shown in perspective view a corner cap 128 that includes two front upper flanges 130,132 and corresponding flanges 134,136 disposed at 90° with respect to flanges 130,132. The flanges 130,134 or 132,136 will fit into track 17 to locate the corner cap in position depending on which way the sign supports are mounted relative to the support assembly 16. For example, if the sign supports are oriented as shown in FIG. 5, the flanges 130,134 are disposed in track 17, but if the sign supports are positioned as shown in FIG. 3, the flanges 132,136 fit into track 17 of the sign supports located at substantially a right angle relative to each other. When the corner cap is located in position, the flange openings 130A in the flanges 130 or 132 line up with openings 140 in the front wall of the sign support 14 and fasteners such as barbed clips extend through the aligned openings to lock the corner cap in place. Appropriate openings and fasteners are provided to lock the flanges 134 or 136 in position relative to the sign support disposed at 90° to the front sign support.

Figures 23, 24, 25:
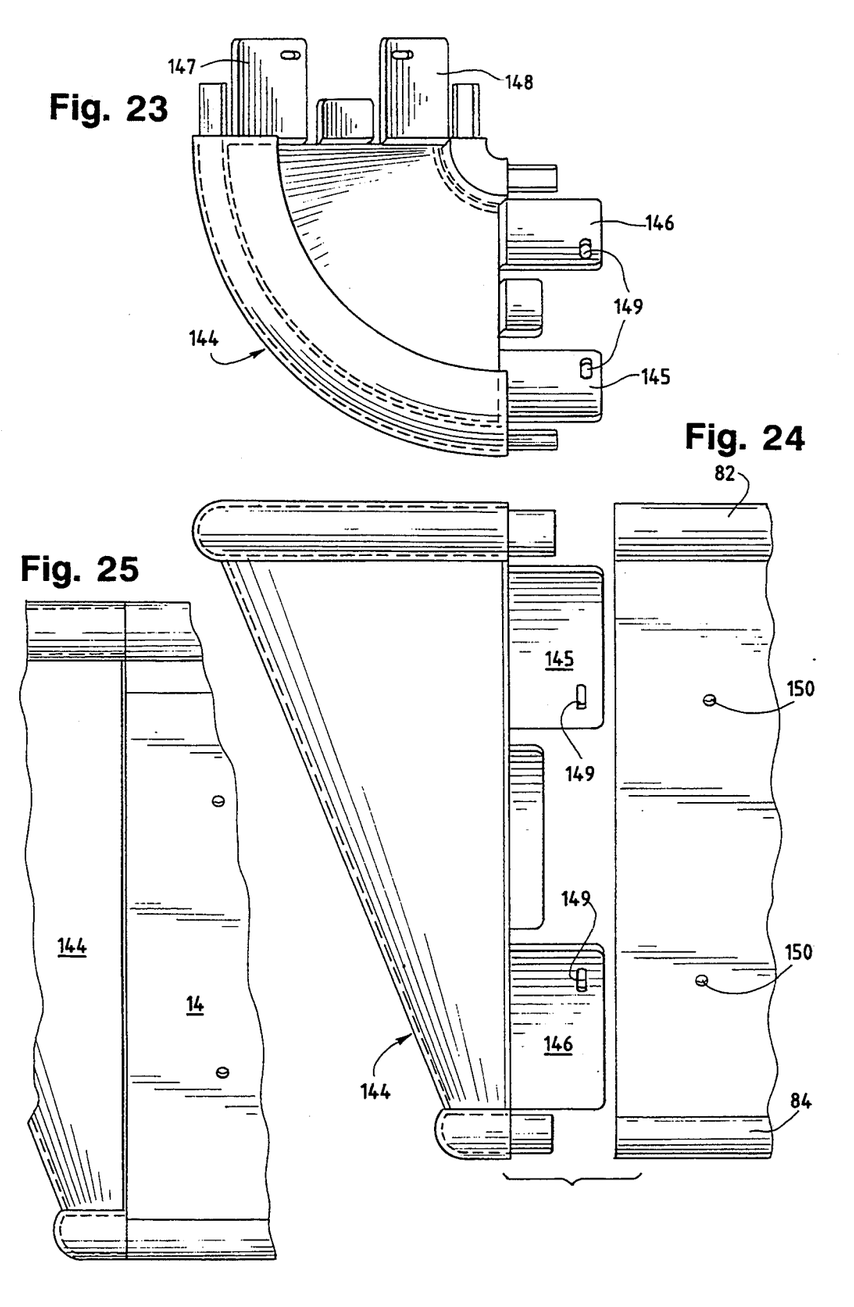
FIG. 23 shows a plan view of a corner connector in which the sign support is angularly disposed in a downwardly and inwardly direction toward the gondola system.
FIG. 24 is a view showing the corner connector prior to insertion into the front sign support.
FIG. 25 is a partial front elevational view showing the corner connector disposed within the front sign support.

In the situation where the front sign support is located in a downwardly angled direction, it can be appreciated that the corner cap arrangement would be essentially triangular in cross section as shown in FIG. 24. The angled corner cap 144 has flanges 145,146 positioned to fit into the front sign support 14 and flanges 147,148 positioned to fit into a sign support disposed at right angles thereto. As discussed with respect to corner cap 128, the flanges of corner cap 144 that engage with tracks 17,19 depend on the orientation of the sign supports 14 with respect to the gondola 10. Openings 149 in the flanges 145 and 146 are aligned with the openings 150 in front sign support 14, and suitable fasteners are extended therethrough to affix the corner cap 144 to the front sign support. The flanges 147,148 are similarly connected to a sign support located at 90° relative to the front sign support.

Figure 26:
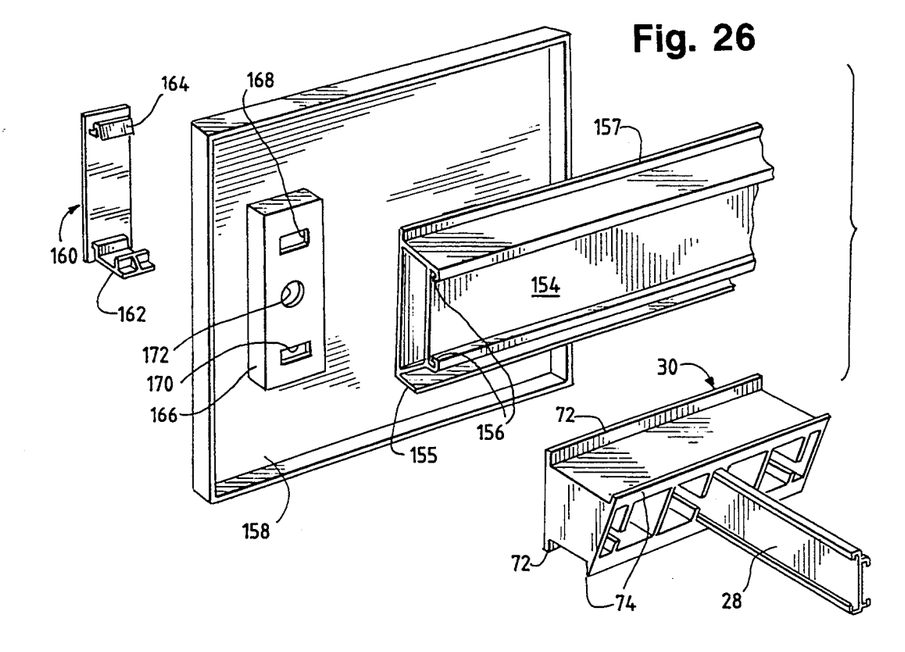
FIG. 26 is an exploded perspective view showing a sign support prior to it being connected to a sign by means of a support clip before the introduction of the support clip into the sign support.
Figure 27:
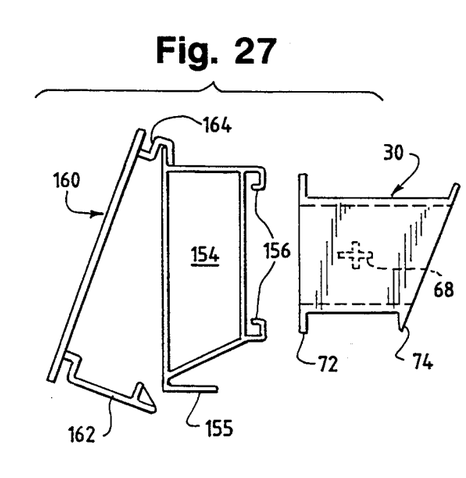
FIG. 27 is an exploded front elevational view prior to the mounting of the sign clip on the sign support and support clip.
Figure 28:
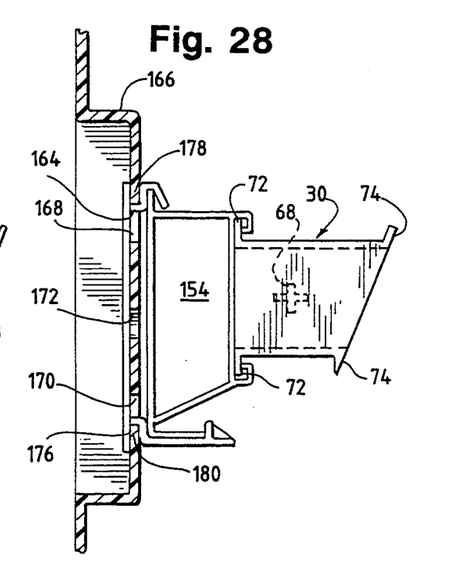
FIG. 28 is a front elevational view showing the support clip, sign support, sign clip, and sign disposed in position.

In the event it is desired to provide a sign assemblage of a different configuration than those shown in FIGS. 1–25, the same support assembly 16 can be used with several additional members in order to mount the sign support relative to the support assembly. This construction is shown in FIGS. 26–28 where there is illustrated a rectangular shaped sign 158, which shape is merely intended to be representative, since it obviously can be any shape desired. The sign 158, which can be vacuum-formed, is connected to the support clip 30 by the utilization of a sign clip 160 in conjunction with a sign support 154. The sign support 154 is provided with a support clip track 156 which fits over the flanges 72 to interconnect the support clip 30 with the sign support 154. The sign support 154 includes an upper flange 157 and a lower wall 155, which upper flange 157 and lower wall 155 are subsequently engaged by the sign clip 160 that is used to affix the sign 158 to the sign support 154.

In the embodiment illustrated, the sign 158 is provided with a sign box 166 secured to the rear portion thereof. As shown in FIG. 28, the sign clip 160 includes an upper guide 164 and a lower channeled wall 162 that extends through openings 168,170, respectively, of the sign box 166. In order to deflect the wall 162 to permit it to be inserted through the slot 170 in the sign box 166, a finger hole 172 is provided for bowing channeled wall 162. When it is extended through the box 166, the clip 160 will be in the position shown in FIG. 28 wherein the clip 160 will retain the lower flange 155 of the sign support 154 as well as interengage with the flange 157 of the sign support 154. It will be noted that clip 160 forms recesses 174,176 that fit around the corresponding flanges 178,180, respectively, of the box 166. Thus, it can be seen that we have provided a novel way for attaching a sign of whatever configuration desired through the action of a sign support 154 to a support clip 30 and a gondola system 10.

Figure 29:
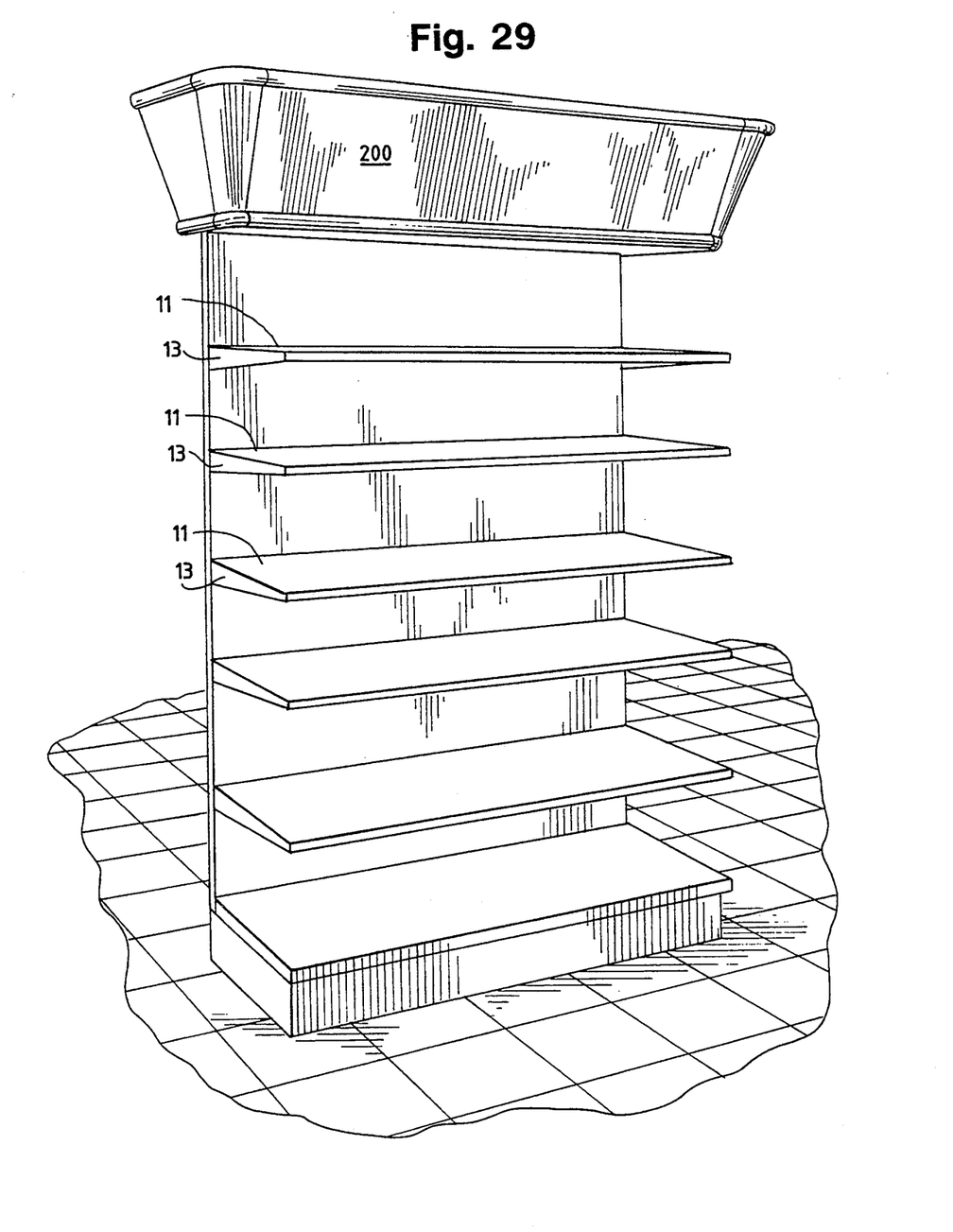
FIG. 29 is a perspective view of a gondola system with a modular sign secured to the upper part thereof.

To facilitate an understanding of the application of the invention, a gondola system is illustrated in FIG. 29 along with a novel modular sign system 200 disposed thereon.

The following claims are intended to cover the invention in various broad and specific forms and are not intended to be limited to the specific configurations disclosed in the drawings.

What is claimed is:

1. A sign display system for a shelving structure comprising a sign support assembly adapted to be connected to the shelving structure, said support assembly comprising a bracket constructed and arranged to be connected to the shelving structure, a support arm, means interconnecting said bracket to one end of said support arm, a support clip comprising an elongated box-like member for receiving a sign support, means interconnecting said support clip and the other end of said support arm, said support clip and said sign support defining interengaging means for connecting the sign support to the support clip for supporting the sign relative thereto.

2. A sign display system as set forth in claim 1 in which the support clip has a trapezoidal cross section which includes a first face and a second face opposite said first face and disposed at an oblique angle with respect to said first face whereby the sign supported thereby can be either disposed normal to its support assembly or at an oblique angled relationship with respect thereto.

3. A sign support assembly in accordance with claim 2 in which the faces of the support clip are adapted to receive said sign support and said sign support defines cooperating flange and track sections to facilitate connection of the sign support to said support clip.

4. A sign display system as set forth in claims 1, 2, or 3 in which the means interconnecting the bracket to the support arm includes a twisted tongue member defined by said bracket and an opening defined by said support arm into which said tongue fits.

5. A sign display system as set forth in claims 1, 2, or 3 in which the support clip defines a plurality of slots and the support arm fits into one of said slots, and the means for interconnecting the support clip to the support arm includes a member secured to said clip that is positioned within said slot to engage an opening defined by said support arm.

6. A sign display system as set forth in claim 5 in which the member within said slot positioned to engage the opening in said support arm comprises a T-shaped connector that defines a projection shaped to fit into the opening in the support arm, which projection defines a camming surface that is engaged by said support arm as it extends into said opening to move it away from said support arm until it is aligned with said opening therein.

7. A sign display system for a shelving structure comprising a sign support assembly adapted to be connected to the shelving structure, said support assembly comprising a bracket constructed and arranged to be connected to the shelving structure, a pair of telescoping support arms, means interconnecting said bracket to one end of one of said support arms, a support clip Comprising an elongated box-like member for receiving a sign support, means interconnecting said support clip and the other end of the other of said support arms, whereby the distance between the shelf system and the support clip can be varied as desired, said support clip and sign support defining interengaging means for connecting the sign support to the support clip for supporting the sign support relative to said support assembly.

8. A sign display system as set forth in claim 7 in which the support clip has a trapezoidal cross section which includes a first face and a second face opposite said first face and disposed at an oblique angle with respect to said first face whereby the sign supported thereby can be either disposed normal to its support assembly or at an oblique angled relationship with respect thereto.

9. A sign display system as set forth in claim 7 in which the support arms define openings and there is a spring clip provided secured to one of said openings in one of said support arms and extending through a corresponding opening in the other of said support arms to retain the telescoping support arms in their preset relationship.

10. A sign display system as set forth in claims 3 or 7 including flanges on said support clip, which flanges extend outwardly from the first and second faces thereof, said sign support defines tracks into which said flanges fit to locate the sign support relative to the support clip.

11. A sign display system as set forth in claim 7 in which the means connecting the bracket to the support arm includes a twisted tongue member defined by said bracket and an opening defined by said support arm into which said tongue fits.

12. A sign display system as set forth in claims 3 or 7 in which the sign support defines a plurality of track sections whereby the sign support can be located at various positions relative to the shelving structure.

13. A sign display system as set forth in claims 1 or 7 in which there are two sign supports located in abutting relationship, said sign supports defining aligned openings and an alignment clip means is inserted into said aligned openings whereby the sign supports are positioned relative to each other.

14. A sign display system as set forth in claims 1 or 7 in which the sign support is provided with guide means within which is located a reinforcing structure to strengthen the sign support.

15. A sign display system as set forth in claims 1 or 7 in which there is provided a bottom panel connected to said sign support to block off a bottom of said sign.

16. A sign display system as set forth in claim 15 in which means are provided for supporting the bottom panel relative to said support arms.

17. A sign display system as set forth in claim 16 in which the bottom panel support means includes a generally L-shaped structure that is located underneath the bottom panel and extends over said support arm to support the bottom panel relative to the support arms.

18. A sign display system as set forth in claim 17 including L-shaped support means for supporting the bottom panel intermediate its ends thereof to prevent sagging of the bottom panel relative to the sign support assembly.

19. A sign display system as set forth in claims 1 or 7 including corner cap assemblies to interconnect a front sign support and a sign support disposed at an angle to said front sign support to make the transformation between the signs disposed at substantially a right angle to each other.

20. A display system for a shelving structure comprising a sign support assembly adapted to be connected to the shelving structure, said support assembly comprising a bracket constructed and arranged to connect to the shelving structure, support arm means, means interconnecting said bracket to one end of said support means, a support clip comprising an elongated box-like member, means interconnecting said support clip and the other end of said support means, a sign support constructed and arranged to connect to said support clip, a sign to be disposed on said sign support and a sign clip for connecting said sign to said sign support.

21. A sign display system as set forth in claim 20 wherein said sign defines openings and said sign support defines clip receiving portions whereby the sign is secured to said sign support by extending said sign clip through said openings and engaging said clip receiving portions.

22. A sign display system as set forth in claim 20 in which the means connecting the bracket to the support means includes a twisted tongue member defined by said bracket and an opening defined by said support means into which that tongue fits.

23. A sign display system as set forth in claim 20 in which the support clip defines a plurality of slots and the support means fits into one of its slots, and the means for interconnecting the support clip to the support means includes a member secured to said clip that is positioned within said slot to engage an opening defined by said support means.

24. A support clip defining a plurality of slots, a plurality of projection means disposed adjacent each of said slots for engaging with a support member disposed therein which support member defines an opening adapted to receive one of said projection means, said support clip defining an angled and vertical surfaces whereby a sign adapted to be connected thereto can be oriented vertically or at an angled surface relative thereto.

25. A support clip as set forth in claim 24 in which the projection means includes a + shaped projection adapted to fit into the openings in the support means disposed within the slots in the support clip.

26. A support clip as set forth in claim 25 which defines flanges extending outwardly from said angled and vertical surfaces that are adapted to be disposed in a sign support to position a sign support relative to said support clip.

* * * * *